United States Patent Office 2,828,011
Patented Mar. 25, 1958

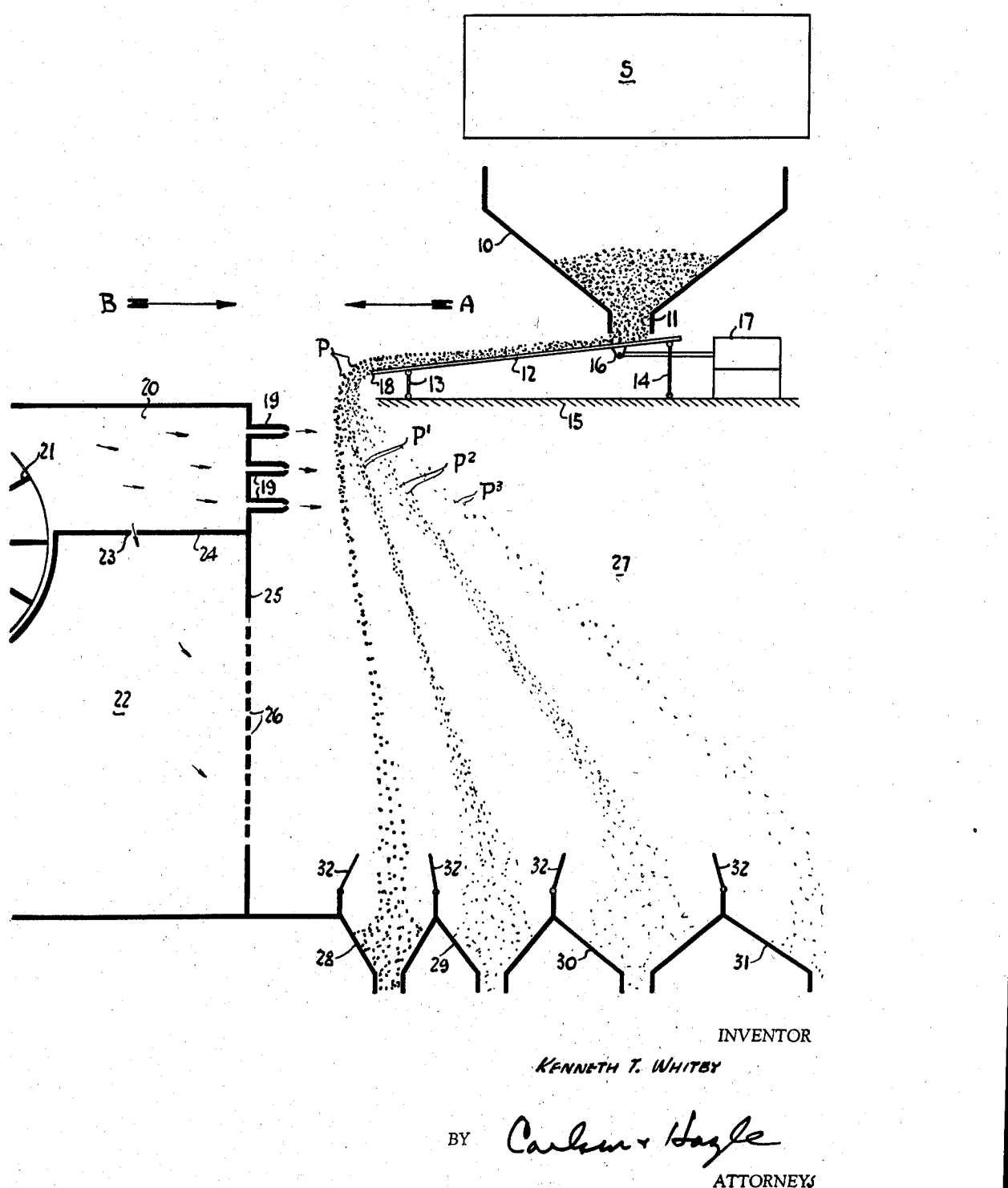

2,828,011
STRATIFIER AND AIR SEPARATOR

Kenneth T. Whitby, Minneapolis, Minn., assignor to Superior Separator Company, Hopkins, Minn., a corporation of Delaware Application March 4, 1953, Serial No. 340,291

3 Claims. (Cl. 209—20)

This invention relates to improvements in the art of air separation or classification of particles of material and while being particularly useful in conjunction with the classification of middling stocks in flour mills, is also useful wherever finely comminuted and particulate materials must be separated and classified.

Essentially the invention involves the separation or classification of materials falling in a thin curtain into the path of one or more air jets, so that particles of different terminal velocities are directed in differing trajectories into separate collecting receptacles. It is the primary object of my invention to provide improvements and refinements in terminal velocity separators of this general nature, based upon sound principles and offering a degree of separating and classification efficiency heretofore impossible to attain. In accordance with my invention the particulate material is first of all delivered over a vibrating feeder shoe, the operation of which will stratify the material and achieve an initial rough separation, whereupon the stratified material is permitted a free fall for some distance before it is subjected to the action of air issuing from one or more jets, with the air from the jets causing an impulse to be imparted to the particles in order to separate them according to their differing terminal velocities. Thus it will be evident that there are three fundamental considerations involved, first of which is the initial stratification, secondly the free fall of the material before it reaches the jets, so that the length of time in the jet is proportional to the terminal velocity of the falling particles, and finally the driving of the particles by air issuing from the jets into differing trajectories according to their differing terminal velocities.

In the interests of simplicity of this description I will first describe the operation of my separator for size separation of particles in the following specification, but as stated it does have particular application to the separation and classification of middling stocks which require the separation to be according to differences in the shape of the particles. When so used I contemplate still another separation so as to reduce the particles to a nominal size range before they are subjected to the action of the air separator, and it is accordingly another object of my invention to provide an improved method for the classification of middling stocks which will permit a highly efficient separation of particles which are of substantially uniform density and of nominal size range according to differences in the shape of the particles.

Still another object of my invention is to provide an apparatus for air separation which will operate very efficiently with very low power requirements and which is of small size and simple construction.

These and other more detailed and specific objects will be disclosed in the course of the following specification, reference being had to the accompanying drawing, in which:

In the drawing I have illustrated very diagrammatically an air separator according to my invention.

As stated I will at the outset discuss my invention as applied to the size separation and classification of particulate material, and referring to the drawing it will be noted that the material is supplied to a hopper 10 having an outlet 11 from which the material falls upon an elongated feed shoe 12. The feed shoe is supported for lengthwise vibratory motion upon pivoted links 13 and 14 at its opposite ends, which links are in turn pivoted on any suitable stationary support 15. While pivoted links are here shown, it is obvious that springs might as readily be employed for supporting the shoe and such variation is considered as within the scope of my invention. Connected at 16 to the shoe is the operating element or plunger of a vibrator 17 of any commercially available form, also suitably carried upon the support 15. The vibrator imparts vibratory motion to the shoe and the support for the latter is such that, in addition to the lengthwise reciprocation thereof, there is also a component of arcuate movement such that the material moving along the shoe is stratified and the coarser particles brought to the upper part of the stream, as clearly indicated in the drawing. Of course, the shoe also slopes toward its delivery edge 18 to assist in the feed travel of the material.

Material falling from the delivery edge 18 of the shoe, after a free fall of some distance, is impinged by substantially horizontally directed air currents issuing from one or more nozzles 19, through which air is supplied from a wind box 20 by any suitable means, such as the fan partially indicated at 21. For convenience the air streams issuing from the nozzles 19 will hereinafter be referred to as jets and preferably there are several of such nozzles located one above the other, as clearly shown. Obviously the length of the nozzles, or rather the width thereof, will be at least equal to the width of the curtain of material falling from the feed shoe. Below the wind box 20 is another air chamber 22 into which air is bled from the wind box through a restricted orifice 23 formed in a dividing partition 24, and in what may be regarded as the forward wall 25 of the chamber 22 there is a perforated or reticulated area 26 below the nozzles 19.

Below the material feeding assembly there is a separating chamber 27 and the bottom thereof is provided with a number of separate collecting receptacles 28, 29, 30 and 31 taking any suitable form, such as hoppers, trays or the like, according to the use to which the apparatus is to be put. Preferably, although not necessarily, the upper edges of these receptacles 28–31 are provided with adjustable baffle wings 32 by which the effective opening of the receptacles exposed to falling material may be adjusted and regulated.

Considered in its fundamental aspects it is believed that the operation of the apparatus as thus far described is quite apparent and that it will be readily understood that the material falling into the jets issuing from the nozzles 19 will be directed into differing trajectories according to differences in their terminal velocities and thus will be separately collected in the receptacles 28–31. It is to be noted, and it is very important, that there is a counterflow of the material being separated, as indicated by the arrow A, and of the air jets issuing from the nozzles 19, as indicated by the arrow B. Since we are here considering the separation and classification of material according to size the larger particles of material are indicated at P and the particles of diminishing size are indicated at $P^1$, $P^2$ and $P^3$. The counterflow of the material and air is important for the reason that, due to the stratification of the material by the feed shoe 12, the smaller particles in the falling curtain of material are in effect "behind" or downstream from the larger particles, or further from the nozzles 19, and it is therefore unnecessary to blow the smaller particles through the larger during separation, as would be the case were there no counterflow and no initial stratification of the material.

Turning now to the more critical aspects of the invention which are so important to the efficient air separation and classification of materials, it may be said that there are three fundamentals involved, or in reality three distinct, consecutive steps in the separation. The first of these is the stratification of the material by the vibratory feeder, as outlined supra, and in addition to this action bringing the coarser particles to the top of the stream of the material on the shoe it will also be noted that these coarser particles will fall in a trajectory further away from the delivery edge 18 than will the finer particles. This, then, is the initial stage of the separation of the coarse from the fine particles.

The free fall of this stratified material before it reaches the air jets causes the length of time in the jet to be proportional to the terminal velocity of the falling particles and the coarser particles may fall faster than the fines, or put in another way, the coarser particles may have a greater relative downward velocity. The impulse transmitted to a particle falling through the air jet is governed by the formula:

Impulse = air drag on particle × time in jet

Thus it will be apparent that the relative horizontal deflection of the particles by the air jets will be proportional to the impulse given to the particles and thus, since I allow the particles to fall a short distance before they reach the jets, they are in the jet a time proportional to their terminal velocities in air and this is the second step or stage of separation.

The above equation shows that the impulse given by the jet is proportional to the air drag on the particle multiplied by the time in the jet and there are two expressions which relate the terminal velocity of the particle to its size, shape, etc. The first of these expressions or formulae is known as Stokes' law and applies if the flow of fluid (which in this case of course is air) around the particle is streamline. The second applies if the flow of the air around the particle is turbulent and these expressions are as follows:

A    Streamline flow $V_T = \dfrac{K_1 \rho d^2}{\mu}$ where $V_T$ is the terminal velocity of the particle
$\rho$ the density difference between the particle and air
$d$ is the particle size
$K_1$ a constant depending on the particle shape in streamline flow
$\mu$ the viscosity of the fluid (air).

B    Turbulent flow $V_T = K_2 \sqrt{\rho}\, d$ where again
$V_T$ is the terminal velocity
$\rho$ the density difference
$d$ the particle size, but
$K_2$ is a constant dependent on the particle shape in turbulent flow.

Since the density and viscosity of the air may be regarded as constant for practical purposes, the terminal velocity of the particles thus depends on the shape, density and size.

Experimentally it has been found that the first expression A given above applies up to a terminal velocity of about eighty feet per minute and that the second applies above a terminal velocity in the neighborhood of four hundred feet per minute. The intervening region of flow from eighty to four hundred feet per minute is a transition region. It is important to choose the velocity according to the nature of the separation being made and where the separation is by size, conditions applying in the expression A are most desirable, but considering the application of the separator to the application of middling stocks, which may be made up of rather squarish pieces of endosperm, commingled with flat pieces of bran, the differences between the density of these particles can be regarded as insignificant thus leaving only the shape and size of the particles of importance in determining their terminal velocities in the air jet. A comparison of the above expressions shows that B is the least dependent upon size and density but the most dependent upon shape, and thus conditions suitable to separation under the second expression, or above four hundred feet per minute are most desirable for separation by shape. Thus jet velocities high enough to bring the relative velocity between jet and particle into the turbulent region are used and in my experiments I have used velocities in the fifteen hundred to twenty-five hundred range.

It is quite apparent that a small, squarish particle of endosperm might have the same treminal velocity as a larger, flat piece of bran and thus effective separation of middling stocks can only be satisfactorily accomplished in a terminal velocity separator if there is a preliminary sifting or sizing operation to reduce the stocks to approximately a nominal particle size.

I have accordingly in the drawing indicated in a block diagram S is sifting or sizing unit, for reducing the material to a nominal size range, as supplying the material to the hopper 10 and regard as one aspect of my invention the method of terminal velocity separation of stocks according to differences in particle shape which includes as a first step the sizing of the particle and subsequently the stratification and free fall of the material by the feeder and finally the separation by a counterflow of the particle and the air used for imparting velocity to the particles.

It will be apparent that the particle size range is important and I have determined by extensive experimentation that the efficiency of separation is sufficient for commercial purposes where the range in particle size is within, say, thirty percent of the mean particle size. This can be stated as the difference between the mesh opening in the screen through which the particles pass (throughs) and the mesh opening in the screen on which the particles are retained (overs) should not exceed thirty percent of the mean of the two sizes of mesh. Reduced to formula this is as follows:

$$\dfrac{\text{Through mesh dimension} - \text{over mesh dimension}}{\text{Mean of through and over mesh dimension}} = \text{less than } 30\%$$

Careful consideration of both sifting and separation and proper application of the principles thereof make it possible not only to recover low ash middlings from the tail of the mill but also render my invention applicable to laboratory uses as an instrument for analyzing the performance of present purifiers. In fact my experiments have made it clear that separation of branny and difficult to purify stocks near the tail of the mill and from a dust sifter, as an example, may be accomplished as follows:

*Table 1*

| Air Separation | Percent of Total Stream | Ash |
|---|---|---|
| 1 | 16.6 | .508 |
| 2 | 44.0 | .668 |
| 3 | 18.0 | .990 |
| 4 | 14.3 | 1.258 |
| 5 | 5.1 | 1.572 |
| Original | 100.0 | .912 |

It will be obvious to those skilled in this field that, following air separation, the particles recovered in the first and second operations above, i. e., in the first and second receptacles in the separator, have sufficiently low ash content to be sent back to the head of the mill.

To illustrate the manner in which my air separator may be used for analysis of the performance of a purifier, the following table is given, the stock being the head cut of a purifier in the middle of the reduction system of the mill and going to second sizings:

*Table 2*

| Air Separation | Percent of Total Stream | Ash |
|---|---|---|
| 1 | 16.3 | .358 |
| 2 | 50.8 | .360 |
| 3 | 27.0 | .460 |
| 4 | 5.9 | .720 |
| Original | 100.0 | .406 |

Such analysis will demonstrate that there remains some bran in the stock which could be removed but separation 1 and 2 are very clean and may be reduced immediately to flour. Separation 3 indicates that sufficient bran remains and gradual reduction is necessary while separation 4 will obviously be branny and quite grey in color and should be sent on to the tail of the mill.

While I have herein discussed my invention in detail in its adaptation to flour mill uses, it is to be understood that I do not limit myself to this particular field. Obviously the separator will have many other uses, such as for the separation and classification of metal powders and other comminuted products which are difficult if not impossible to separate with any worthwhile efficiency by prior apparatus.

Referring again to the drawing, the provision of the chamber 22 and perforated area 26 to which air is fed from the wind box 20 is designed to provide a very slight plus pressure in the zone beneath the nozzles 19 without which there is a tendency for the lighter or finer particles to collect at this point. The air streams issuing from the nozzles are believed to create a minus pressure zone beneath them and it is believed sufficient if the air supplied at 26 just overcomes this tendency toward the creation of such minus pressure.

One great advantage of my invention lies in its extreme simplicity and its very low power requirements as compared to other separators of present forms. As an example, and again referring to flour mill usage, a separator capable of handling 300 pounds per hour of middlings would require only 150 watts to power both the vibrator and to supply air to the nozzles. Space requirements, which are always a problem, are also nominal for the separator of my invention.

It will, of course, be understood that the shoe 12 will have sufficient width to stratify the material in a comparatively thin stream and that the nozzles 19 will also have sufficient width to act upon the full width of the stream or curtain of material falling from the shoe. The vertically spaced series of nozzles is desirable so that the air will act on the stream as it separates into its component particle P, P¹, etc., to insure a proper separation.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. Apparatus for air separation of particulate material, comprising in combination, a feed shoe having a discharge end, means for supplying the material to be separated to the shoe, means for vibrating the shoe to feed the material along the shoe in one direction and to stratify the material according to differences in its particles as the material falls from the discharge end of the shoe, a series of vertically spaced air jet nozzles located to direct air jets into the material falling from the shoe and to direct said air in a direction opposite that traveled by the material over the shoe whereby there is a counterflow of the material and of the air, means for supplying air to the nozzles, separate receptacles located below the nozzles for collecting the particles of differing terminal velocities given differing trajectories by the air from the nozzles, and means for discharging air into a zone below the nozzles generally horizontally and in an amount sufficient to prevent the air jets issuing from those nozzles from creating a minus pressure at said zone.

2. An air jet separator of the character described, comprising means for stratifying a particulate material in a generally horizontally moving stream and then discharging the material in a falling curtain, air jet means located adjacent the path of the material and directing air across the full width of the curtain thereof and in a substantially horizontal zone substantially below the discharge of said material after the same has had a substantial free fall and in a direction such that the air will first impinge the stratum of material brought to the top of the stream before it falls, means for supplying the air under pressure to said jet means, means for separately collecting the particles of the material of differing terminal velocities given different trajectories by the air under pressure, and means for also supplying air in a zone below said air jet means to counteract the tendency of the air from said jets to create a negative pressure in said zone.

3. Apparatus for air separation of particulate material, comprising in combination, a feed shoe having a discharge end, means for supplying the material to be separated to the shoe, means for vibrating the shoe to feed the material along the shoe in one direction and to stratify the material according to differences in its particles as the material falls from the discharge end of the shoe, a series of vertically spaced air jet nozzles located to direct air jets into the material falling from the shoe and to direct said air in a direction opposite that traveled by the material over the shoe whereby there is a counterflow of the material and of the air, a wind box supplying air to said nozzles, a series of receptacles below the nozzles and spaced in a horizontal direction therefrom for separately collecting the particles separated by the air from the falling material, means forming an air chamber below the nozzles and having an upright perforated wall, and means for bleeding air into the said air chamber for discharge through said wall outward below the nozzles.

References Cited in the file of this patent

UNITED STATES PATENTS

| 293,103 | Scottiaux | Feb. 5, 1884 |

FOREIGN PATENTS

| 279,041 | Italy | Oct. 29, 1930 |
| 424,698 | Germany | Jan. 29, 1926 |

OTHER REFERENCES

Rock Products, volume 54, Number 9, September 1951, pages 75 to 77.

Taggart: Handbook of Mineral Dressing, © 1945, section 11, page 03.